US011419340B2

(12) United States Patent
Clerx et al.

(10) Patent No.: US 11,419,340 B2
(45) Date of Patent: Aug. 23, 2022

(54) ELECTROSTATIC SPRAY CHILLING OF FOODSTUFFS

(71) Applicants: Graco Minnesota Inc., Minneapolis, MN (US); Hubertus J. Van Laer, Weert (NL)

(72) Inventors: Bart Clerx, Hoelbeek (BE); Hubertus J. Van Laer, Weert (NL)

(73) Assignee: Graco Minnesota Inc., Minneapolis, MN (US)

(*) Notice: Subject to any disclaimer, the term of this patent is extended or adjusted under 35 U.S.C. 154(b) by 664 days.

(21) Appl. No.: 16/402,811

(22) Filed: May 3, 2019

(65) Prior Publication Data
US 2019/0254297 A1    Aug. 22, 2019

(51) Int. Cl.
| A23B 4/08 | (2006.01) |
| A23B 4/30 | (2006.01) |
| A23B 4/06 | (2006.01) |
| A23B 7/04 | (2006.01) |

(52) U.S. Cl.
CPC .............. *A23B 4/08* (2013.01); *A23B 4/062* (2013.01); *A23B 4/30* (2013.01); *A23B 7/0408* (2013.01); *A23V 2002/00* (2013.01)

(58) Field of Classification Search
CPC .. A23B 4/08; A23B 4/062; A23B 4/30; A23B 7/0408; A23V 2002/00
USPC ........................................................ 426/235
See application file for complete search history.

(56) References Cited

U.S. PATENT DOCUMENTS

| 4,004,733 A |   | 1/1977  | Law |
| 4,196,221 A | * | 4/1980  | Dew ..................... A22B 5/08 |
|             |   |         | 426/235 |
| 4,271,683 A |   | 6/1981  | Williams |
| 4,273,293 A |   | 6/1981  | Hastings |
| 4,325,221 A |   | 4/1982  | Grewar |
| 4,810,515 A |   | 3/1989  | Bourdel |
| 6,451,364 B1|   | 9/2002  | Ito |
| 7,128,937 B2|   | 10/2006 | van den Nieuwelaar et al. |
| 7,891,209 B2|   | 2/2011  | van den Nieuwelaar et al. |
| 8,033,485 B2|   | 10/2011 | Yamaguchi |

(Continued)

FOREIGN PATENT DOCUMENTS

| CN | 101006800 A | 8/2007 |
| DE | 2733297 A1  | 5/1981 |

(Continued)

OTHER PUBLICATIONS

International Search Report and Written Opinion for PCT Application No. PCT/US2020/031009, dated Jul. 31, 2020, pp. 10.

(Continued)

*Primary Examiner* — Hamid R Badr
(74) *Attorney, Agent, or Firm* — Kinney & Lange, P. A.

(57) ABSTRACT

An electrostatic spray chilling system is configured to rapidly cool foodstuffs. A conveyor traverses foodstuffs through a chilling tunnel. A chilled primary airflow is provided to the chilling tunnel to cool the foodstuffs. As the foodstuff is traversed through the chilling tunnel, spray modules generate and apply sprays of electrostatically charged fluid onto the foodstuff. The charged fluid droplets are attracted to the grounded foodstuff. The charged fluid droplets can be guided onto the foodstuff by secondary fans, configured to generate subflows of the chilled primary air, and by air guiding baffles.

19 Claims, 5 Drawing Sheets

(56) References Cited

U.S. PATENT DOCUMENTS

| | | |
|---|---|---|
| 8,061,150 B2 | 11/2011 | Kim et al. |
| 8,556,237 B2 | 10/2013 | Yamaguchi et al. |
| 8,991,203 B2 | 3/2015 | Okabe et al. |
| 9,770,040 B2 | 9/2017 | Gutzmann et al. |
| 2002/0139126 A1 | 10/2002 | Butler |
| 2003/0037563 A1 | 2/2003 | Maxwell et al. |
| 2004/0211194 A1 | 10/2004 | Kaminski et al. |
| 2004/0241295 A1* | 12/2004 | van den Nieuwelaar ............ A23B 4/062 426/326 |
| 2005/0034565 A1 | 2/2005 | Drzewiecki |
| 2007/0251249 A1 | 11/2007 | Burk |
| 2010/0055270 A1 | 3/2010 | Glascock et al. |
| 2010/0236269 A1 | 9/2010 | Mamemoto et al. |
| 2010/0243767 A1 | 9/2010 | Mori et al. |
| 2012/0318884 A1 | 12/2012 | McCormick et al. |
| 2016/0227795 A1 | 8/2016 | Heston |
| 2018/0092370 A1 | 4/2018 | Ravishankar et al. |

FOREIGN PATENT DOCUMENTS

| | | |
|---|---|---|
| EP | 1511390 A1 | 3/2005 |
| FR | 2389330 A1 | 12/1978 |
| FR | 2422338 A2 | 11/1979 |
| WO | WO2008010874 A1 | 1/2008 |
| WO | WO2009151597 A1 | 12/2009 |

OTHER PUBLICATIONS

Leandra P. Santos, "Water with Excess Electric Charge," pubs.acs.org/JPCC, Institute of Chemistry, 2011, pp. 11226-11232.

* cited by examiner

102 — Generating a chilled primary airflow and blowing the chilled primary airflow into a chilling tunnel 104 — Traversing foodstuff through the chilling tunnel 106 — Spraying via an electrostatic sprayer, a charged water spray onto the foodstuff

Fig. 3

ELECTROSTATIC SPRAY CHILLING OF FOODSTUFFS

BACKGROUND

This disclosure relates generally to spray chilling. More particularly, this disclosure relates to electrostatic spray chilling.

Foodstuffs, such as meat carcasses, require effective cooling to preserve the foodstuffs for safe consumption. For example, carcasses typically have a core temperature of about 40-degrees C. (about 104-degrees F.) immediately after slaughtering. The carcass is quickly cooled to a temperature of about 4-7-degrees C. (about 40-45-degrees F.) for biochemical, bacteriological, and physical reasons. Typically, the carcass is placed in a cold environment to effect a heat transfer between the warm carcass and cold air to cool the carcass to the desired temperature.

The carcasses can experience significant weight loss due to evaporation during the chilling process. Forced air movement blows the cold air over the carcasses to accelerate the cooling process and reduce weight loss. Spraying water droplets onto the carcasses can also accelerate the cooling process and reduce weight loss. However, introducing water to the cooling process can delay cooling because freezing of the water on the carcass, floor, walls, ceiling, and other constructions is undesirable, so temperatures above freezing are typically used. In addition, condensation can be formed in the cooling area and drip onto the carcasses, which can lead to bacteriological contamination. Also, the effectiveness of spraying is relatively low as only a small portion (typically about 20%) of the sprayed water is actually effective in reducing weight loss of the carcass.

SUMMARY

According to one aspect of the disclosure, a method of spray chilling includes generating a chilled primary airflow and blowing the primary airflow into a chilling tunnel; traversing, via a conveyor line, a foodstuff through the chilling tunnel; generating, via a first electrostatic sprayer, a charged fluid spray; and applying the charged fluid spray onto the foodstuff.

According to another aspect of the disclosure, a spray chilling system includes a primary blower configured to generate a chilled primary airflow; a conveyor line configured to traverse foodstuff within a chilling tunnel; and a plurality of spray modules disposed along the conveyor line and configured to spray charged fluid onto the foodstuff. A first one of the spray modules includes a first electrostatic sprayer configured to generate a first charged fluid spray and spray the first charged fluid spray onto the foodstuff, and a first secondary fan disposed between the first electrostatic sprayer and the primary blower, the first secondary fan configured to generate a first subflow of the chilled primary airflow and blow the first subflow towards the first electrostatic sprayer.

DETAILED DESCRIPTION

Figure 1A:
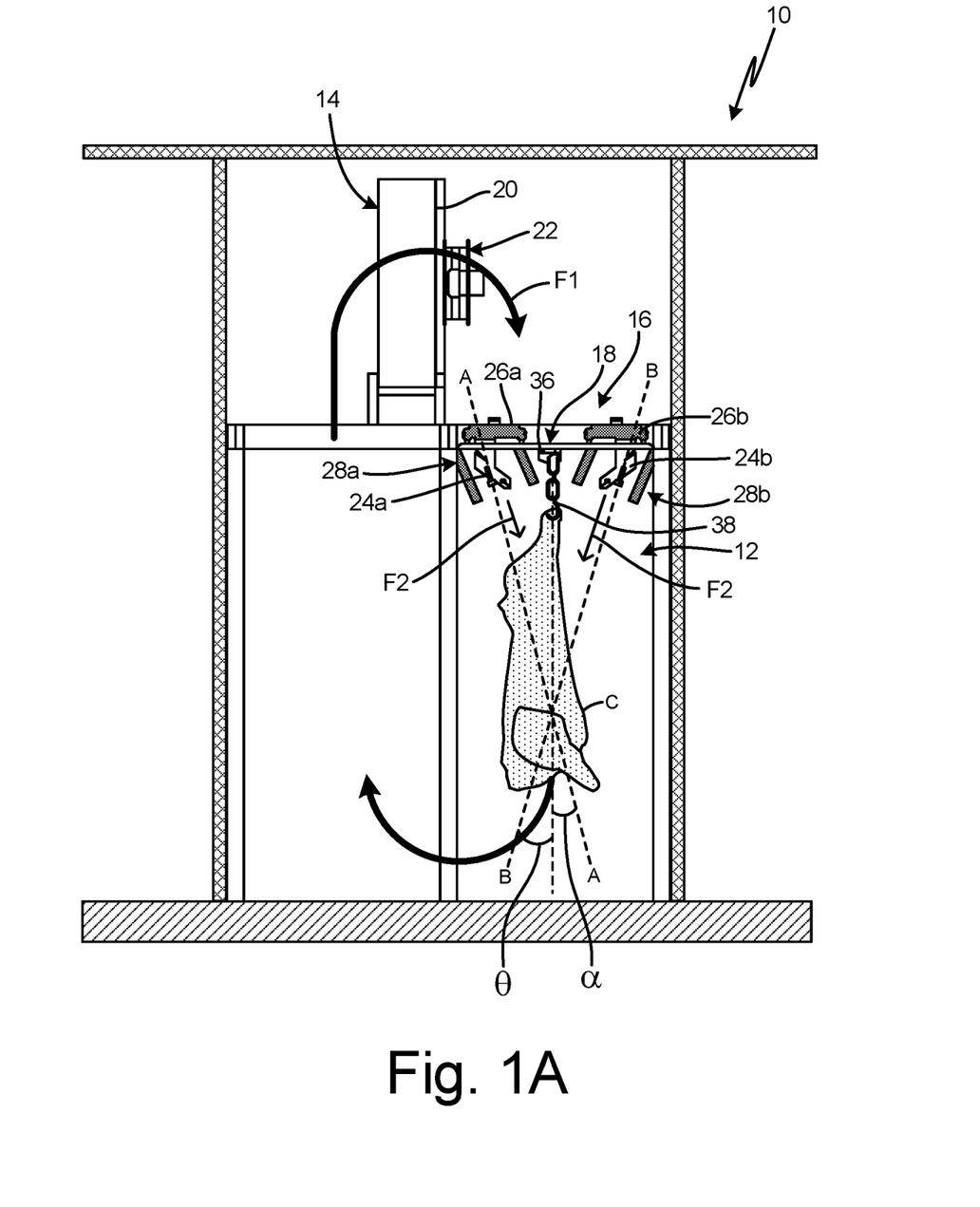
FIG. 1A is a side schematic diagram of a spray chilling system.
Figure 1B:
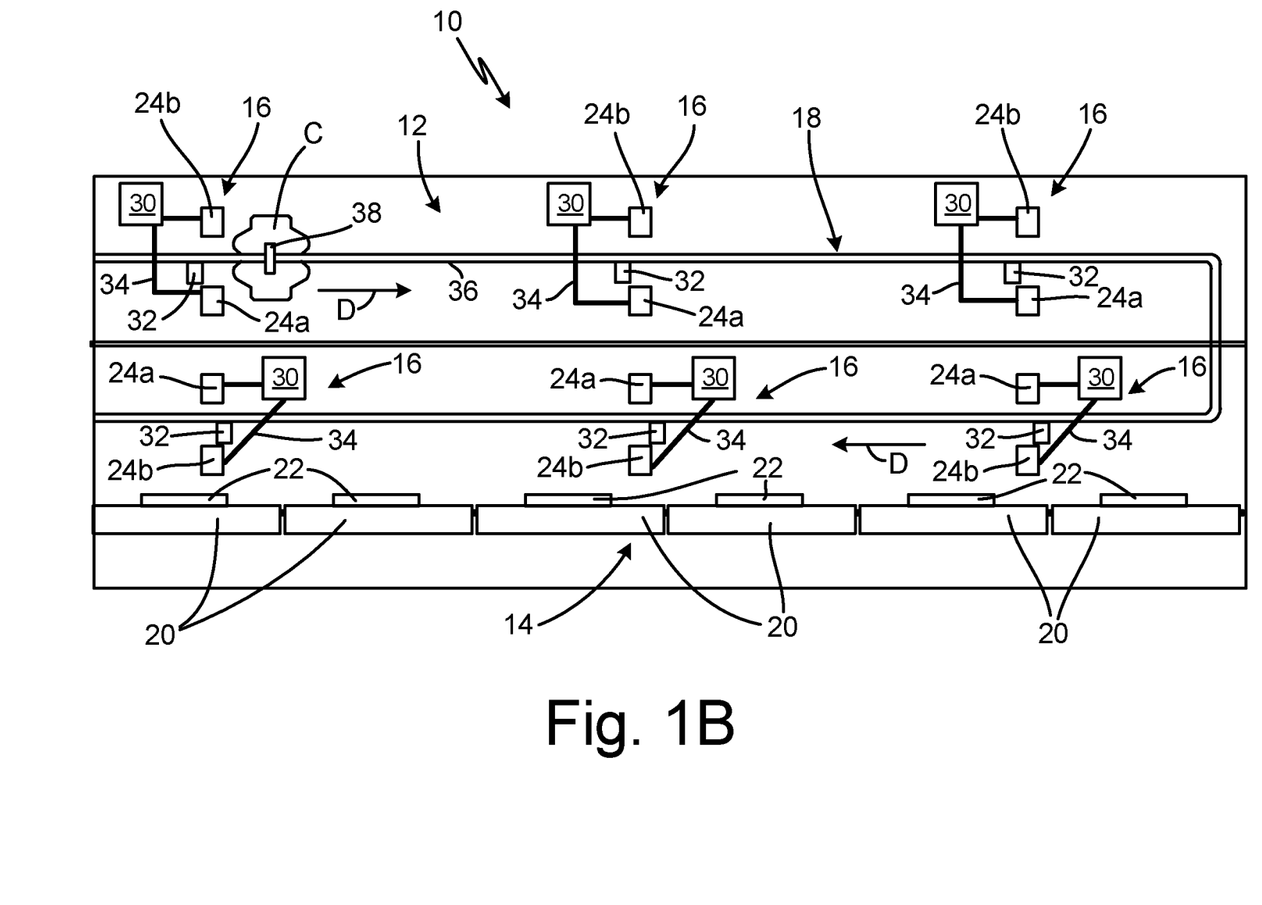
FIG. 1B is a top schematic diagram of a spray chilling system.

FIG. 1A is a side schematic diagram of spray chilling system 10. FIG. 1B is a top schematic diagram of spray chilling system 10. FIGS. 1A and 1B will be discussed together. Spray chilling system 10 includes chilling tunnel 12, primary blower 14, spray modules 16, and conveyor 18. Primary blower 14 includes cooling elements 20 and primary fans 22. Each spray module 16 includes electrostatic sprayers 24a, 24b; secondary fans 26a, 26b (FIG. 1A); air baffles 28a, 28b (FIG. 1A); reservoir 30 (FIG. 1B); and hook detector 32 (FIG. 1B). Fluid lines 34 (FIG. 1B) extend between reservoirs 30 and electrostatic sprayers 24a, 24b. Conveyor 18 includes conveyor slide rail 36 and hook 38.

Spray chilling system 10 is configured to rapidly cool foodstuff C during processing. For example, spray chilling system 10 can rapidly cool a meat carcass after the animal is harvested/slaughtered. Spray chilling system 10 conveys foodstuff C through chilling tunnel in direction D and reduces the core temperature of foodstuff C via a chilled air flow and charged fluid sprays. The fluid can be of any type suitable for spraying onto foodstuffs during processing, such as water or water-based solutions such as a solution of sodium chloride or other allowed additives in water. While one foodstuff C is illustrated in FIG. 1B, it is understood that spray chilling system 10 is configured to simultaneously chill multiple foodstuffs.

Chilling tunnel 12 is a space configured to chill foodstuffs after harvesting or slaughtering. One or more of conveyor 18 extends through chilling tunnel 12. Conveyor is configured to convey foodstuff C through chilling tunnel 12. Hook 38 is secured to conveyor slide rail 36 and traversed through chilling tunnel 12. Foodstuff C is mounted on hook 38. In the example shown, conveyor 18 is an overhead conveyor, but it is understood that conveyor 18 can be of any configuration suitable for supporting and conveying one or more meat carcasses C within and through chilling tunnel 12. While conveyor 18 is shown as extending straight through chilling tunnel 12, it is understood that conveyor 18 can be disposed in any configuration suitable for conveying meat carcasses C within spray chilling system 10.

Primary blower 14 is disposed at one end of chilling tunnel 12. In some examples, primary blower 14 is disposed proximate the ceiling of chilling tunnel 12. Primary blower 12 is configured to generate a chilled primary airflow F1 and to blow that chilled primary airflow F1 into chilling tunnel 12. Chilled primary airflow F1 circulates within chilling tunnel 12. In some examples, the chilled primary air flows the length of cooling tunnel 12 along the ceiling of chilling tunnel 12 to the wall disposed opposite primary blower 14. The chilled primary air then flows back towards primary blower 14 along the floor of chilling tunnel 12, where the chilling primary air is recirculated by primary blower 14.

Cooling elements 20 reduce the temperature of the primary airflow. In some examples, cooling elements 20 are configured to reduce the temperature of the primary airflow to about 0-degrees C. (about 32-degrees F.). In some examples, cooling elements 20 are configured to chill the primary airflow to a temperature below about 0-degrees C. As such, cooling elements 20 can, in some examples, chill the primary airflow to a temperature at or below the freezing point of water. Cooling elements 20 can be of any type suitable for reducing the temperature of the primary air to a suitably low temperature for chilling foodstuffs.

Primary fans 22 blow the primary airflow chilled by cooling elements 20 into chilling tunnel 12. Primary fans 22 can be of any type suitably configured for blowing chilled primary airflow F1 through chilling tunnel 12. In some examples, primary fans 22 can be configured to generate an airflow having a speed of between about 0.5-2.5 m/s (about 1.5-8.2 ft/s). The velocity of the primary airflow generated by primary fans 22 can be altered to any desired velocity based on the requirements of the foodstuff being chilled.

Spray modules 16 are disposed within chilling tunnel 12 along the length of conveyor 18. Spray chilling system 10 can include as many or as few spray modules 16 as desired. In some example, spray chilling system 10 can include more than twenty spray modules 16. In one example, spray chilling system 10 includes twenty-four spray modules 16. In another example, spray chilling system 10 includes forty-eight spray modules 16. Each spray module 16 is configured to generate and apply a spray of charged fluid to foodstuff C as foodstuff C proceeds through a spray area associated with that spray module 16. The spray area is the area within which spray module 16 is activated to spray charged fluid droplets onto foodstuff C. For each spray module 16, reservoir 30 stores the fluid that is going to be sprayed onto foodstuff C. While each spray module 16 is shown as including a dedicated reservoir 30, it is understood that each reservoir 30 can be connected to supply fluid to one or more than one spray module 16. Spray module 16 is configured to continuously eject charged fluid sprays into the chilled primary airflow F1 so long as foodstuff C is present in the spray area of that spray module 16. Spray module 16 can be configured to stop spraying when no foodstuff C is present in the spray area. Each spray module 16 is individually controllable.

Reservoirs 30 store fluid for spraying by electrostatic sprayers 24a, 24b. Electrostatic sprayers 24a, 24b are fluidly connected to reservoir 30 by fluid lines 34 to receive fluid from reservoir 30. The fluid is charged to a desired spray voltage and sprayed onto and towards foodstuff C. In some example, the fluid is charged to a potential of at least about 10 kilovolts (kV). Charging the fluid to at least 10 kV causes the fluid to break apart into extremely small droplets, such as droplets having an average diameter of about 15-25 micrometers, which droplets enhance cooling due to intense evaporation. In some examples, the droplets have an average diameter of about 20 micrometers. In some examples, the fluid is charged to a potential of about 10 kV-60 kV, and more specifically to a potential of about 20 kV-50 kV. The fluid can be charged in any desired manner, such as by an electrode (not shown) of electrostatic sprayer 24a, 24b, among other options. Foodstuff C is grounded as it traverses chilling tunnel 12. As such, the charged fluid droplets are attracted to foodstuff C and wrap around and evenly coat foodstuff C.

Electrostatic sprayer 24a is mounted on a first side of conveyor 18 and electrostatic sprayer 24b is mounted on a second side of conveyor 18. Electrostatic sprayers 24a, 24b atomize the fluid and eject the fluid in a spray fan, though it is understood that other spray configurations are possible. While each spray module 16 is described as including two electrostatic sprayers (electrostatic sprayers 24a, 24b), it is understood that each spray module 16 can include as few or as many electrostatic sprayers as desired. For example, each spray module 16 can include one, two, three, four, or more electrostatic sprayers. Each of the electrostatic sprayers can be mounted at similar or different angles relative to vertical.

In one example, spray module 16 includes one or more of electrostatic sprayers 24a, 24b mounted above the foodstuff C and includes one or more of electrostatic sprayers 24a, 24b mounted below or beside foodstuff C. The electrostatic sprayers mounted above foodstuff C can be oriented to spray generally downward and the electrostatic sprayers mounted below foodstuff C can be oriented to spray generally upward.

Electrostatic sprayers 24a, 24b are configured to eject compressed air as secondary airflows to atomize the fluid and generate the sprays. The compressed air is ejected from electrostatic sprayers 24a, 24b as secondary airflows F2. The secondary airflow F2 is configured to break up the charged fluid stream ejected from electrostatic sprayer 24a, 24b and to carry the charged fluid spray away from electrostatic sprayer 24a, 24b. The pressure of the compressed air flowing to each electrostatic sprayer 24a, 24b can be controlled to control the droplet size and the shape and width of the spray pattern generated by electrostatic sprayer 24a, 24b. In some examples, the compressed air is pressurized to at least about 150 kilopascal (kPa) (about 21.7 pounds per square inch (psi)), for example, about 150-300 kPa (about 21.7-43 psi). The combination of charged fluid and atomized spray is configured to generate extremely small droplets, such as droplets having a size of about 20 micrometers.

As discussed in more detail below, the compressed air can be heated prior to being ejected by electrostatic sprayer 24a, 24b such that the secondary airflow F2 is warmer than the primary airflow F1 to thereby prevent freezing of the fluid when it is sprayed into the colder primary airflow F1. In some examples, the compressed air can be heated to a temperature of about 5-degrees C. (about 40-degrees F.) or higher. In other examples, the compressed air can be heated to a temperature of about 15-degrees C. (about 60-degrees F.) or higher.

Electrostatic sprayer 24a is configured to spray the fluid along spray axis A-A, and electrostatic sprayer 24b is configured to spray the charged fluid along spray axis B-B. Electrostatic sprayers 24a, 24b are configured to spray generally parallel to the vertical axis on which foodstuff C is hanging. Spray axis A-A is disposed at angle α relative to vertical such that electrostatic sprayer 24a ejects the charged fluid spray along and towards foodstuff C. Similarly, spray axis B-B is disposed at angle θ relative to a vertical axis such that electrostatic sprayer 24b ejects the charged fluid spray along and towards foodstuff C. It is understood that electrostatic sprayers 24a, 24b can be disposed at any desired angle suitable for coating foodstuff C with the charged fluid. In some examples, one or both of angles α and θ can be 0 degrees relative to vertical, such that electrostatic sprayers 24a, 24b spray vertically and the electrostatic attraction pulls the charged droplets onto foodstuff C. In other examples, angles α and θ are between about 5-25 degrees, and more specifically between about 8-17 degrees. It is understood, however, that angles α and 0 can be of any desired angle depending on a variety of factors, such as the distance of electrostatic sprayers 24a, 24b from foodstuff C, the distance of spray module 16 from primary blower 14, and the type of foodstuff being chilled, among other factors.

The chilled primary airflow F1 is relatively turbulent and circulates within chilling tunnel 12. The chilled primary airflow F1 flows transverse to the secondary airflow F2 from electrostatic sprayers 24a, 24b. Secondary fans 26a, 26b and air baffles 28a, 28b are configured to orient the chilled primary airflow F1 at spray module 16 to be generally longitudinally along spray axis A-A at electrostatic sprayer 24a and generally longitudinally along spray axis B-B at electrostatic sprayer 24b.

Secondary fans 26a, 26b are mounted above electrostatic sprayers 24a, 24b. As such, electrostatic sprayers 24a, 24b are disposed between secondary fans 26a, 26b and foodstuff C. Secondary fans 26a, 26b are respectively configured to generate first and second subflows of the chilled primary airflow F1. Secondary fans 26a, 26b are configured to redirect the chilled primary airflow F1 and to blow the first and second subflows substantially longitudinally along the vertical hanging axis of the foodstuff C. It is understood, however, that secondary fans 26a, 26b can be disposed at any desired orientation suitable for redirecting primary chilled airflow F1. For example, each of secondary fans 26a, 26b can be canted relative to a horizontal plane such that secondary fans 26a, 26b are aligned to blow the first and second subflows along spray axes A-A and B-B, respectively. Secondary fans 26a, 26b can be of any type suitably configured to generate an airflow, such as axial fans.

Secondary fan 26a can generate the first subflow such that the first subflow has a velocity substantially similar to the velocity of the secondary airflow F2 from electrostatic sprayer 24a. Secondary fan 26b can generate the second subflow such that the second subflow has a velocity substantially similar to the secondary airflow F2 from electrostatic sprayer 24b. As such, the chilled primary airflow F1, which has been redirected into the first and second subflows, and the secondary airflows F2 can have substantially the same air velocities. Matching the air velocities prevents undesired turbulence and enhances the flow of the charged fluid spray towards foodstuff C.

Air baffles 28a, 28b are disposed proximate secondary fans 26a, 26b and electrostatic sprayers 24a, 24b. Air baffles 28a, 28b are disposed downstream of secondary fans 26a, 26b, respectively, to orient and guide the subflows generated by secondary fans 26a, 26b towards and along electrostatic sprayers 24a, 24b, respectively. Air baffles 28a, 28b further prevent diffusion of the subflows. Each air baffle 28a, 28b includes multiple baffles disposed on the inboard and outboard sides of electrostatic sprayers 24a, 24b relative to conveyor 18. Air baffles 28a, 28b can be of any type suitably configured to orient and guide the subflows. Air baffles 28a, 28b can also be disposed at any desired angle relative to spray axes A-A and B-B, respectively, to direct the first and second subflows.

Air baffle 28a orients the first subflow, generated by secondary fan 26a, to flow substantially along spray axis A-A. Air baffle 28b orients the second subflow, generated by secondary fan 26b, to flow substantially along spray axis B-B. Orienting and guiding the subflows ensures that the chilled primary airflow F1 flows generally longitudinally relative to electrostatic sprayers 24a, 24b, thereby ensuring that the charged fluid sprays are sprayed towards foodstuff C.

Hook detectors 32 are configured to sense when foodstuff C enters the spray area associated with the spray modules 16 associated with that hook detector 32. Spray modules 16 are configured to activate and begin spraying based on hook detector 32 sensing foodstuff C entering the spray area associated with that spray module 16. For example, hook detector 32 can be a Hall Effect sensor, a mechanical sensor actuated by hook 38, or of any other type suitably configured for sensing foodstuff C entering the spray area. Spray chilling system 10 can include one or more controllers (not shown) configured to activate and deactivate spray modules 16 throughout the spray process. For example, the controller can activate a spray module 16 based on a signal from an associated hook detector 32 and can deactivate the spray module 16 based on a set time period passing, based on a signal from a sensor at the end of the spray area, or based on any other desired factor.

During operation, a foodstuff C is placed on conveyor 18 for chilling. For example, foodstuff C can be a meat carcass of a freshly harvested animal can be hung from hook 38. Conveyor slide rail 36 pulls hook 38, and thus foodstuff C, through chilling tunnel 12. Primary blower 14 generates and blows the chilled primary airflow F1 into chilling tunnel 12.

Hook detector 32 senses when foodstuff C enters the spray area associated with spray module 16. Spray module 16 is activated based on foodstuff C entering the spray area. Fluid is drawn from reservoir 30 and pumped to each of electrostatic sprayers 24a, 24b. Electrostatic sprayer 24a ejects a first charged fluid spray along spray axis A-A. Electrostatic sprayer 24b ejects a second charged fluid spray along spray axis B-B. The droplets in each of the first and second charged fluid sprays are attracted to the grounded foodstuff C such that the droplets wrap around and evenly coat the surface of foodstuff C. The small fluid droplets generated by electrostatic sprayers 24a, 24b accelerate the cooling process by evaporating relatively quickly from the surface of foodstuff C. The very small charged droplets generated by electrostatic sprayers 24a, 24b wrap around foodstuff C and crate a thin, homogeneous fluid layer on the surface of foodstuff C. That thin, homogeneous fluid layer also prevents fluid channels from forming on the surface of foodstuff C, which fluid channels can cause discoloration of the foodstuff C.

The intense evaporation and accelerated cooling process reduce weight loss of foodstuff C during the spray chilling process. Electrostatic sprayers 24a, 24b are configured to continuously generate the first and second charged fluid sprays as foodstuff C traverses through the spray area. As such, each spray module 16 is configured to continuously eject charged fluid sprays into the chilled primary airflow F1 so long as foodstuff C is present in the spray area of that spray module 16. Spray modules 16 can be configured to stop spraying when no foodstuff C is present in the spray area.

Secondary fans 26a, 26b redirect the chilled primary airflow F1 by respectively generating the first and second subflows of chilled primary air. Secondary fans 26a, 26b blow the first and second subflows towards electrostatic sprayers 24a, 24b. Air baffles 28a, 28b orient and guide the first and second subflows towards foodstuff C. Electrostatic sprayers 24a, 24b eject secondary airflows F2 of as part of the charged fluid sprays. The first and second subflows flow generally longitudinally with the secondary airflows F2, such that the first and second subflows further guide the charged fluid sprays towards foodstuff C. As discussed above, secondary fans 26a, 26b can be configured to generate first and second subflows having velocities substantially similar to the secondary airflows F2 generated by electrostatic sprayers 24a, 24b.

Spray module 16 stops spraying once foodstuff C passes out of the spray area associated with spray module 16. Conveyor 18 continues to traverse foodstuff C through chilling tunnel 12 where foodstuff C is intermittently dosed with charged fluid from the multiple spray modules 16 in chilling tunnel 12. The relative positioning between spray modules 16 and/or speed of conveyor 18 can be based on when foodstuff C dries from the previous dosing. As such, foodstuff C is recoated with fluid droplets as soon as foodstuff C becomes dry, thereby further inhibiting weight loss during the chilling process. Foodstuff C continues to traverse chilling tunnel 12 until the core temperature has dropped to a desired level.

Spray chilling system 10 provides significant advantages. The charged fluid is electrically attracted to the grounded foodstuff, thereby increasing the transfer efficiency of the fluid onto the foodstuff. The charged fluid wraps around and evenly coats the surface of the grounded foodstuff. In some examples, the transfer yield (e.g., the savings on weight loss/total amount of fluid sprayed) increased from about 17% with uncharged fluid to about 40% with charged fluid. For example, a foodstuff C would lose 2 kg (about 4.41 lbs) during the chilling process without spraying but keeps the 2 kg with spraying, as such the savings on weight loss would be 2 kg. If the total liquid sprayed is 2 L (about 68 fl oz), then the transfer yield would be 100%. The transfer efficiency (e.g., the percentage of fluid discharged from electrostatic sprayers 24a, 24b that contributes directly to the reduction of weight loss of the foodstuff C) also increased relative to uncharged water. Increasing the transfer efficiency reduces the amount of condensation depositing in chilling tunnel 12 and the amount of fluid droplets floating in the air, thereby producing a more sanitary chilling environment. The increased transfer efficiency also reduces waste, thereby reducing cost. The charged fluid also provides benefits in that the highly charged fluid (charge of 10 kV or greater) breaks into extremely small droplets that deposit on the foodstuff. The extremely small droplets evaporate quickly, which accelerates the chilling process. The accelerated cooling process reduces weight loss of the foodstuff that can occur during the chilling process. Spray chilling system 10 can effectively chill foodstuff C, including meat carcasses, with weight losses of about 0.4-0.5% compared with weight losses of about 1.5% with forced air movement and weight loss of about 0.7-1.0% with forced air movement and uncharged water sprays. In addition, the rate of cooling increased about 10-20% relative to cooling utilizing uncharged fluid. As such, spray chilling system 10 quickly cools foodstuff, thereby increasing the amount of foodstuff that can be processed, while limiting any weight losses, thereby increasing the yield of foodstuff during processing.

Figure 2A:
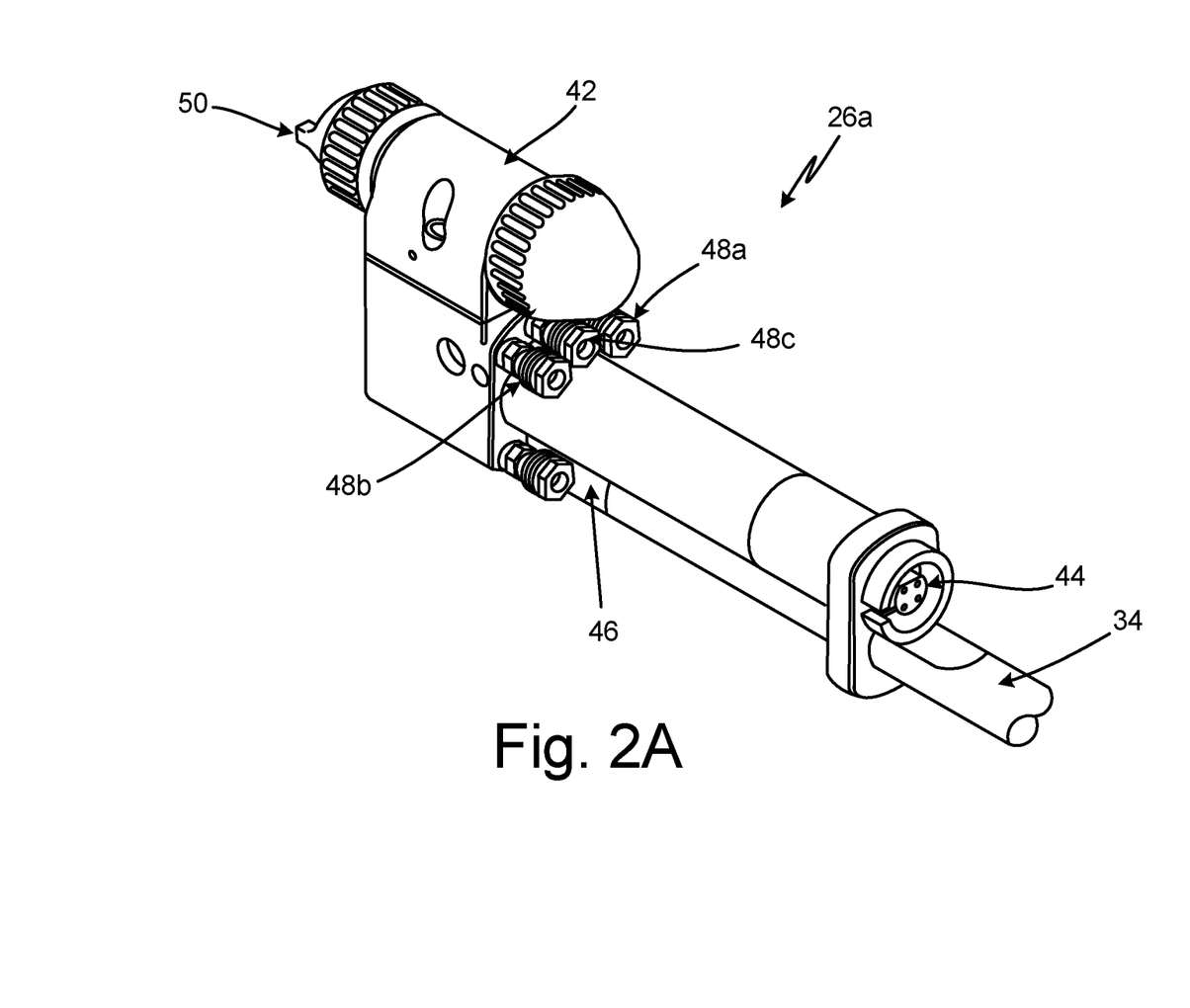
FIG. 2A is an isometric view of an electrostatic sprayer.
Figure 2B:
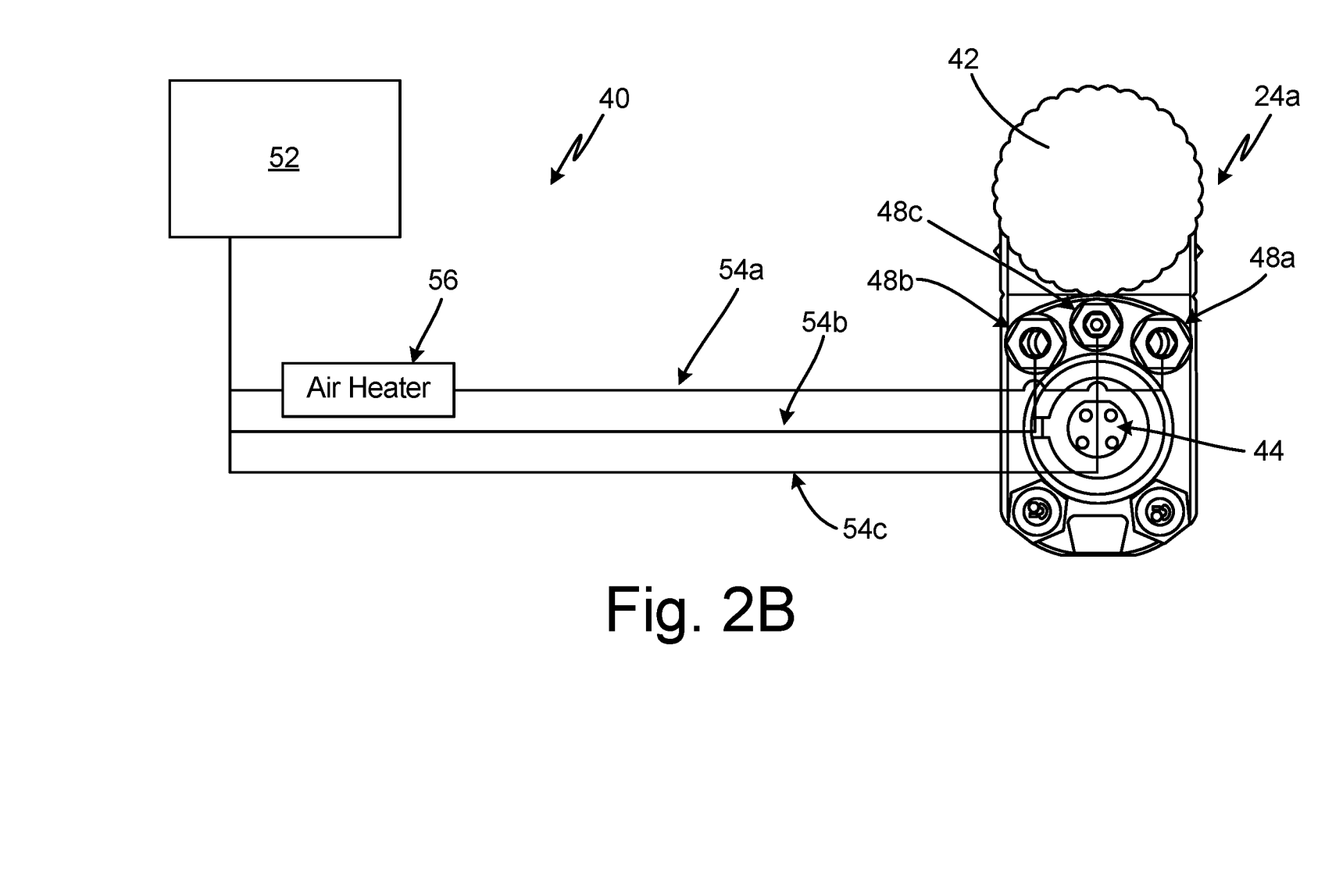
FIG. 2B is a schematic view of a pneumatic supply system for an electrostatic sprayer.

FIG. 2A is an isometric view of electrostatic sprayer 24a. FIG. 2B is a schematic diagram of pneumatic supply system 40 for electrostatic sprayer 24a. FIGS. 2A and 2B will be discussed together. Electrostatic sprayer 24 includes sprayer body 42, power inlet 44, fluid inlet 46, air inlets 48a-48c, and air cap 50. Pneumatic supply system 40 includes air source 52, air lines 54a-54c, and heater 56.

Electrostatic sprayer 24a is configured to generate a charged fluid spray during operation of spray chilling system 10 (FIGS. 1A and 1B). Sprayer body 42 can be mounted at any desired location for automatic operation of electrostatic sprayer 24. It is understood, however, that electrostatic sprayer 24a can be of any desired configuration suitable for charging fluid and applying a charged fluid spray to foodstuff C.

Electrostatic sprayer 24a is substantially similar to electrostatic sprayer 24b and it is understood that the discussion of electrostatic sprayer 24a applies equally to electrostatic sprayer 24b. Fluid line 34 extends to fluid inlet 46 of electrostatic sprayer 24a. Fluid line 34 is configured to provide fluid from reservoir 30 (FIG. 1B) to electrostatic sprayer 24a. The fluid is ejected through air cap 50. Power inlet 44 of electrostatic sprayer 24a is configured to receive a power cable to provide power to charge an electrode (not shown) of electrostatic sprayer 24a. The electrode projects through air cap 50 and is configured to charge the fluid spray.

Air inlets 48a-48c are connected to pneumatic supply system 40 to receive compressed air from pneumatic supply system 40.

Pneumatic supply system 40 is configured to provide compressed air to electrostatic sprayer 24a to generate the secondary airflow F2 (FIG. 1A). Air source 52 is configured to compress air and provide the compressed air to electrostatic sprayer 24a. Air source 52 can be of any type suitably configured to compress air. Air line 54a extends from air source 52 to air inlet 48a to provide a first portion of compressed air to electrostatic sprayer 24a. Air line 54b extends from air source 52 to air inlet 48b to provide a second portion of compressed air to electrostatic sprayer 24a. Air line 54c extends from air source 52 to air inlet 48c to provide a third portion of compressed air to electrostatic sprayer 24a. In the example shown, the first portion of compressed air is atomizing air that is ejected from air cap 50 and breaks up the charged fluid stream and controls droplet size. The second portion of compressed air is fan air that is ejected from air cap 50 and controls the shape and width of the spray pattern. The third portion of compressed air is trigger air that controls activation of electrostatic sprayer 24. The first portion of compressed air and the second portion of compressed air form the secondary airflow F2 ejected from electrostatic sprayer 24a.

Heater 56 is disposed on air line 54a between air source 52 and air inlet 48a. Heater 56 is configured to heat the first portion of air prior to the first portion or air being ejected from air cap 50. In some examples, the compressed air can be heated to a temperature of about 5-degrees C. or higher. In other examples, the compressed air can be heated to a temperature of about 15-degrees C. or higher. The first portion of air, which breaks up and atomizes the charged fluid, is heated to prevent the charged fluid from freezing at air cap 50 and/or after ejection from electrostatic sprayer 24a. While heater 56 is described as disposed on air line 54a, it is understood that heater 56 can, in some examples, be integrated into electrostatic sprayer 24a and/or be configured to additionally and/or alternatively heat air line 54b.

Figure 3:
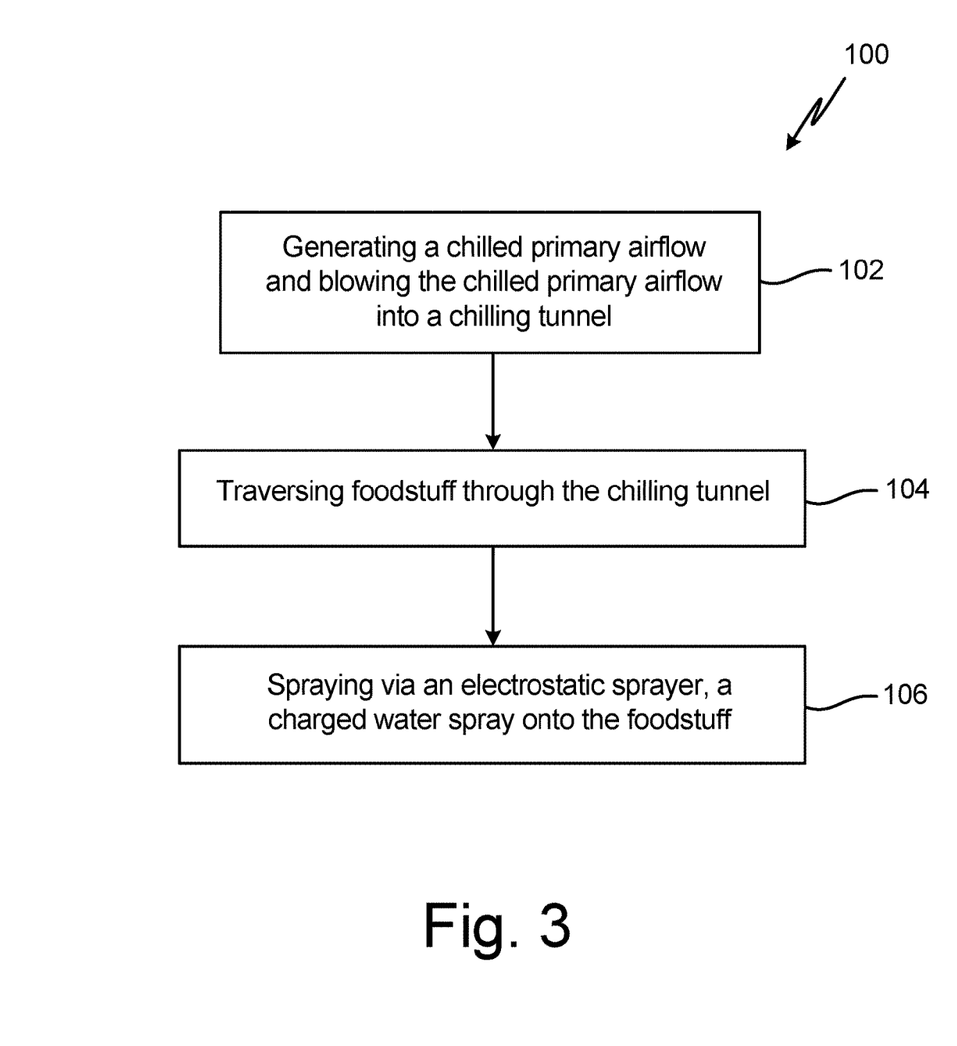
FIG. 3 is a flowchart illustrating a method of spray chilling.

FIG. 3 is a flowchart illustrating method 100 of spray chilling. In step 102, a chilled primary airflow is generated and provided to a chilling tunnel, such as chilling tunnel 12 (FIGS. 1A and 1B). A primary blower, such as primary blower 14 (FIGS. 1A and 1B), chills the air and blows the air into the chilling tunnel. The primary blower can chill the primary airflow to any temperature suitable for chilling the foodstuffs being processed. In some examples, the primary blower is configured to chill the primary airflow to a temperature of about 0-degrees C. (about 32-degrees F.). In some examples, the primary blower is configured to chill the primary airflow to a temperature below about 0-degrees C. As such, the primary blower can, in some examples, generate a primary airflow that is chilled to at or below the freezing point of water.

In step 104, a foodstuff, such as foodstuff C (FIGS. 1A and 1B), is traversed through the chilling tunnel. The foodstuff can be mounted on a conveyor, such as conveyor (FIGS. 1A and 1B) that extends through the chilling tunnel. The conveyor carries the foodstuff through the chilling tunnel where the chilled primary airflow conducts heat from the foodstuff, thereby reducing the core temperature of the foodstuff and chilling the foodstuff.

In step 106, an electrostatic sprayer, such as electrostatic sprayer 24 (best seen in FIG. 2A), generates and sprays a charged fluid spray onto the foodstuff. In some examples, the fluid is charged to about 10-60 kV. In some examples, the fluid is charged to 20-50 kV. The charged fluid is attracted to the nearest grounded object, which is the foodstuff suspended by the conveyor. The charged fluid wraps around and evenly coats the surface of the foodstuff. Charged fluid droplets having a charge of greater than about 10 kV disintegrate into extremely small droplets that go into a process of accelerated evaporation. In some examples, the charged fluid droplets have an average diameter of about 15-25 micrometers. In some examples, the droplets have an average diameter of about 20 micrometers. The extremely small droplets deposit on the surface of the foodstuff and accelerate the cooling process, thereby reducing the weight lost from the foodstuff throughout the cooling process.

The electrostatic sprayer can eject a secondary airflow to generate the charged fluid spray. For example, a pneumatic line can extend to the electrostatic sprayer to provide compressed air to the electrostatic sprayer. The compressed air can be split into multiple feeds, such as atomizing air and fan air. The atomizing air breaks up the charged fluid stream and controls droplet size. The fan air controls the shape and width of the spray pattern. The compressed air can be heated prior to being ejected from electrostatic sprayer to avoid freezing of the spray droplets due to the chilled primary airflow. For example, a heater can be disposed on the pneumatic line providing the atomizing air to the electrostatic sprayer. In some examples, the compressed air can be heated to a temperature of about 5-degrees C. (about 40-degrees F.) or higher. In other examples, the compressed air can be heated to a temperature of about 15-degrees C. (about 60-degrees F.) or higher.

The secondary airflow carries the charged fluid spray into the chilling tunnel and towards the foodstuff. In some examples, secondary fans, such as secondary fans 26a, 26b (FIG. 1A), and air baffles, such as air baffles 28a, 28b (FIG. 1A), orient and guide the primary airflow along the spray axis of the electrostatic sprayer. Orienting and guiding the primary airflow parallel to the secondary airflow from the electrostatic sprayer protects the integrity of the charged fluid spray generated by the electrostatic sprayer. Protecting the integrity of the charged fluid spray ensures that the droplets are directed towards and/or parallel to the foodstuff.

Method 100 provides significant advantages. The charged fluid is electrically attracted to the grounded foodstuff, thereby increasing the transfer efficiency of the fluid onto the foodstuff. In some examples, the transfer yield increased from about 17% with uncharged fluid to about 40% with charged fluid. The transfer efficiency is also increased. Increasing the transfer efficiency reduces the amount of condensation depositing in the cooling space and the amount of fluid droplets floating in the air, thereby producing a more sanitary chilling environment. The increased transfer efficiency also reduces waste, thereby reducing cost. The charged fluid also provides benefits in that the charged fluid breaks into extremely small droplets that deposit on the foodstuff. The extremely small droplets evaporate quickly, which accelerates the chilling process. The accelerated cooling process reduces weight loss of the foodstuff that can occur during the chilling process. In some examples, the rate of cooling increased about 10-20% relative to cooling utilizing uncharged fluid. The secondary airflow from the electrostatic sprayer can also be heated, thereby preventing freezing at the electrostatic sprayer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of spray chilling, the method comprising:
   generating a chilled primary airflow and blowing the primary airflow into a chilling tunnel;
   traversing, via a conveyor line, an electrically grounded foodstuff through the chilling tunnel;
   generating a charged liquid spray;
   applying the charged liquid spray to the foodstuff; and
   orienting, via an air guiding baffle, the primary airflow along a first spray axis of a first electrostatic sprayer such that the primary airflow flows generally parallel to the first spray of charged liquid generated by the first electrostatic sprayer, the first spray axis disposed at a first angle relative to vertical.

2. The method of claim 1, wherein the step of generating the chilled primary airflow includes chilling the primary airflow to a temperature at or below 0° C.

3. The method of claim 1, wherein applying the charged liquid to the foodstuff includes:
   spraying a first spray of charged liquid onto the foodstuff along the first spray axis via the first electrostatic sprayer; and
   spraying a second spray of charged liquid onto the foodstuff along a second spray axis, the second spray axis disposed at a second angle relative to vertical via a second electrostatic sprayer.

4. The method of claim 1, further comprising:
   generating, via a first secondary fan, a first subflow of the primary airflow, the secondary fan blowing the first subflow towards the first electrostatic sprayer configured to emit the charged liquid spray.

5. The method of claim 4, further comprising:
   generating, via a second secondary fan, a second subflow of the primary airflow, the second secondary fan blowing the second subflow towards a second electrostatic sprayer;
   guiding, via a first baffle, the first subflow along the first spray axis of the first electrostatic sprayer, wherein the air guiding baffle is formed by the first baffle; and
   guiding, via a second baffle, the second subflow along a second spray axis of the second electrostatic sprayer.

6. The method of claim 1, wherein generating the charged liquid spray includes:
   charging the liquid to a charge of 20-50 kV.

7. A method of spray chilling, the method comprising:
   generating a chilled primary airflow and blowing the primary airflow into a chilling tunnel;
   traversing, via a conveyor line, an electrically grounded foodstuff through the chilling tunnel;
   generating a charged liquid spray;
   generating a secondary airflow and ejecting the secondary airflow from a first electrostatic sprayer to atomize liquid droplets into the charged liquid spray;
   heating the secondary airflow prior to ejecting the secondary airflow from the first electrostatic sprayer; and
   applying the charged liquid spray to the foodstuff.

8. The method of claim 7 further comprising:
   heating the secondary airflow to a temperature of at least 5° C.

9. The method of claim 8, further comprising:
heating the secondary airflow to a temperature of at least 15° C.

10. The method of claim 7, wherein generating the secondary airflow and ejecting the secondary airflow from the first electrostatic sprayer to atomize liquid droplets into the charged liquid spray includes:
pressurizing the secondary airflow to a pressure of at least 150 kPa bar to generate a pressurized secondary airflow and ejecting the pressurized secondary airflow from the first electrostatic sprayer.

11. The method of claim 1, wherein the charged liquid spray includes charged liquid droplets having a diameter of about 20 micrometers.

12. A method of spray chilling, the method comprising:
generating a chilled primary airflow and blowing the primary airflow into a chilling tunnel;
traversing, via a conveyor line, an electrically grounded foodstuff through the chilling tunnel;
generating a charged liquid spray;
applying the charged liquid spray to the foodstuff; and
activating an electrostatic sprayer based on a hook detector detecting the foodstuff entering a spray area of the electrostatic sprayer.

13. The method of claim 12, further comprising:
deactivating the electrostatic sprayer based on the foodstuff exiting the spray area.

14. A spray chilling system comprising:
a primary blower configured to generate a chilled primary airflow;
a conveyor line configured to traverse electrically grounded foodstuff within a chilling tunnel;
a plurality of spray modules disposed along the conveyor line and configured to spray charged liquid onto the foodstuff, wherein a first spray module of the plurality of spray modules comprises:
a first electrostatic sprayer configured to spray a first charged liquid spray onto the foodstuff; and
a first secondary fan disposed between the first electrostatic sprayer and the primary blower, the first secondary fan configured to generate a first subflow of the chilled primary airflow and blow the first subflow towards the first electrostatic sprayer.

15. The spray chilling system of claim 14, wherein the first spray module further comprises:
a first air baffle disposed proximate the first electrostatic sprayer and oriented to guide the first subflow along a first spray axis of the first electrostatic spray gun.

16. The spray chilling system of claim 15, wherein the first spray module further comprises:
a second electrostatic sprayer configured to spray a second charged liquid spray onto the foodstuff;
a second secondary fan disposed between the second electrostatic sprayer and the primary blower, the second secondary fan configured to generate a second subflow of the chilled primary airflow and blow the second subflow towards the second electrostatic sprayer; and
a second air baffle disposed proximate the second electrostatic sprayer and oriented to guide the second subflow along a second spray axis of the second electrostatic spray gun.

17. The spray chilling system of claim 16, wherein the first electrostatic sprayer is disposed on a first side of the conveyor line and the second electrostatic sprayer is disposed on a second side of the conveyor line.

18. The spray chilling system of claim 17, wherein the first spray axis is oriented towards the conveyor line relative to vertical and the second spray axis is oriented towards the conveyor line relative to vertical.

19. The spray chilling system of claim 14, further comprising:
a pneumatic line extending to a first electrostatic spray gun to provide compressed air to the electrostatic spray gun, the first electrostatic spray gun configured to eject the compressed air as a secondary airflow to atomize the first charged liquid spray; and
a heater disposed on the pneumatic line to heat the compressed air such that the secondary airflow is warmer than the primary airflow.

* * * * *